United States Patent [19]

Whigham

[11] 4,031,600

[45] June 28, 1977

[54] ATTACHMENT MEANS FOR A MACHINERY DRUM COVER

[75] Inventor: Biddle A. Whigham, Lancaster, Pa.

[73] Assignee: The Fluorocarbon Company, Anaheim, Calif.

[22] Filed: Nov. 10, 1975

[21] Appl. No.: 630,109

[52] U.S. Cl. .................... 29/118; 29/129.5; 83/347; 83/659

[51] Int. Cl.² .................... B60B 7/00

[58] Field of Search ......... 29/118, 125, 129, 129.5; 83/347, 659

[56] References Cited

UNITED STATES PATENTS

| | | | |
|---|---|---|---|
| 1,752,005 | 3/1930 | Johnston | 29/118 |
| 3,529,336 | 9/1970 | Winkler et al. | 29/132 |
| 3,602,970 | 9/1971 | Smith | 29/118 |
| 3,765,329 | 10/1973 | Kirkpatrick et al. | 83/659 X |
| 3,880,037 | 4/1975 | Duckett et al. | 83/347 X |

FOREIGN PATENTS OR APPLICATIONS

| | | | |
|---|---|---|---|
| 457,188 | 2/1935 | United Kingdom | 29/118 |

*Primary Examiner*—Wayne L. Shedd
*Attorney, Agent, or Firm*—Knobbe, Martens, Olson, Hubbard & Bear

[57] ABSTRACT

A replaceable cover band for a machinery drum wherein the respective ends of the cover have mating flange portions which join together within a transverse slot located in the surface of the drum. Aligned apertures are located in the respective overlapping flanges for receipt of securing bolts to fasten the respective ends to the drum. Mounted in one of the flanges is a support bar which provides strength to that portion of the cover band which extends over the slot in the drum.

11 Claims, 8 Drawing Figures

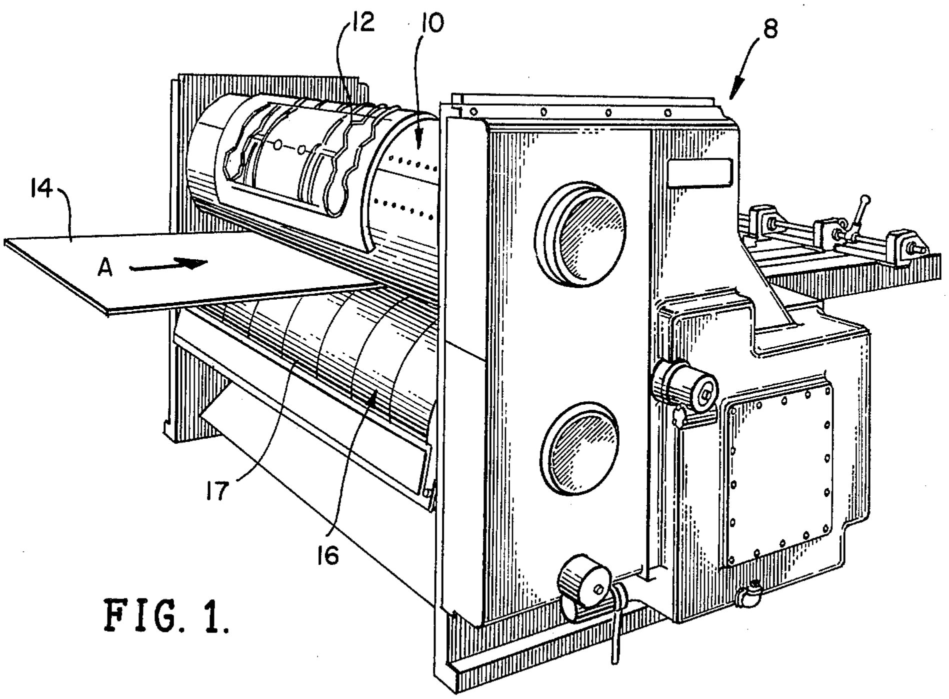
FIG. 1.
FIG. 2.
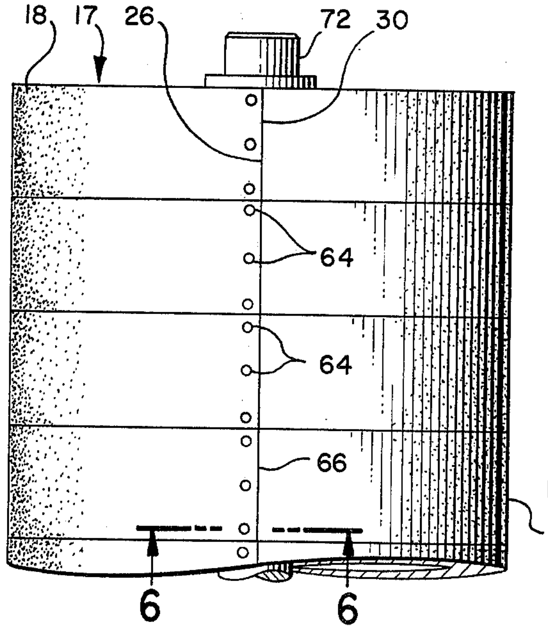
FIG. 3.
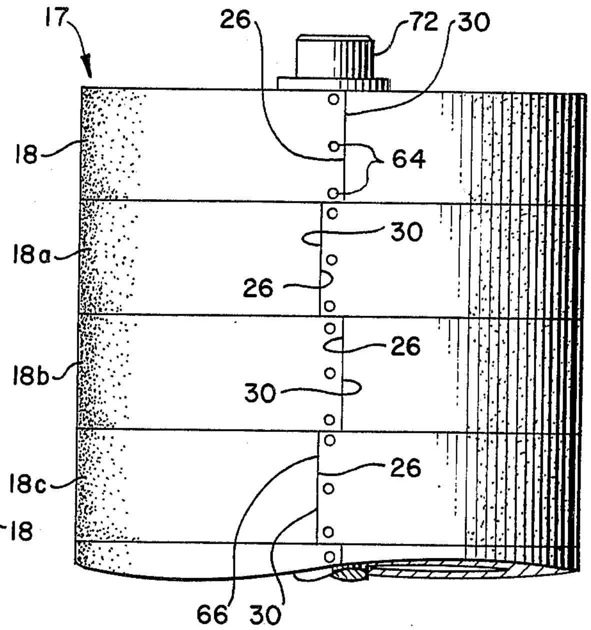

ATTACHMENT MEANS FOR A MACHINERY DRUM COVER

BACKGROUND OF THE INVENTION

This invention relates to the field of machinery rollers or drums and more particularly is related to the fastening of replaceable covers on rollers which are used an an anvil roller adjacent cutting rollers to provide a cutting surface for sheet material being transferred between the rollers. It is quite common in the industry of producing items from, for example, corrugated board material to utilize a rotary die cutter to produce the particular end product. The normal arrangement includes two adjacent rollers wherein one roller contains the cutting tools and an adjacent roler provides a contact surface for the blades which cut through the product material. In order to reduce general wear on the blades the exterior surface of the adjacent anvil roller is covered with a somewhat resilient or pliable cover material. Howevwer, after a significant amount of use the blades will wear or deteriorate the resilient cover to the point that is necessary to replace the cover.

It is very important to the efficiency of the overall manufacturing process to be able to replace the cover on the adjacent roller without having to disassemble the machinery and remove the drum. Consequently, a tubular type of covering may not be utilized, since it cannot be conveniently slipped over the end of the roller. Therefore, various means have been devised to removably attach a cover band or sheet around the drum. It is necessary that the roller cover be of a uniform thickness around the roller, so that, when the cutting blade from the cutting roller contacts the cover material in the adjacent anvil roller it will experience the same general resiliency in the cutting surface to insure proper cutting of the material passing between the rollers. Typically, roller covers comprise a plurality of separate circumferential cover bands which are affixed to the roller and are tightly adjacent each other.

In the prior art a transverse slot parallel to the roller axis has been incorporated in the surface of the roller into which respective flanges of each end of the roller cover material are inserted. However, it is necessary to have some type of metal support bar located within the slot below the respective ends of the cover mateial, so that the part of the cover material which extends over the slot will have adequate support and thickness equal to the rest of the surface of the drum. One type of prior art has utilized an L-shaped flage on each of the cover bands' transverse ends which must be placed within the slot prior to the placement of the support bar in the slot, because the support bar is anchored over a portion of each flange to secure the ends of the cover band to the roller. Since it is desirable to limit the number of transverse seams in the cover band to one and since the cover band is to still to bend back from over the slot, the support bar must be inserted or slid into the slot from the end of the roller, requiring the removal of all the cover bands in cases where only one needs to be removed.

Another prior approach uses a separate strip of the cover material placed over the support bar in the slot to eliminate the need to slide the support bar in from the end of the roller. However, this results in an undersirable double seam. The existence of multiple seams in the cover detracts from the general smooth continuous surface and increases potential problems where the cutting blades may become lodged within the seams. A related problem to the use of a separate strip of cover material is the undesirable slippage which commonly occurs in the strip. The movement of the adjacent rollers and their respective contact causes the strip portion to shift and move, adversely affecting the continuity of the surface necessary for a successful cutting operation.

Commonly, previous cover band latching device tend to clamp the respective ends of the cover in place in the slot by the compressive force of a flanged support bar anchored to the roller by the fastening means. However, as a result of the forces exerted on the cover band associated with the cutting operation, the respective ends of the cover may transversely slip possibly causing an undesirable gap with the next adjacent cover band.

SUMMARY OF THE INVENTION

The present attachment means for the elastomer roller cover comprises a flange on each end of the cover which are deisgned to seat within a slot transversely oriented in the roller surface. The flange on one end of the roller cover is integrally connected to the thin metal backing which is found on the cover material and has a general L-shaped cross section with the bottom shoulder situated adjacent the bottom of the slot. The flange on the second end of the roller cover has a metal support bar preferably molded within the flange which is positioned within the slot over the L-shaped flange of the first end of the roller cover. Aligned bolt holes are located within both the L-shaped flange of the first end of the roller cover and the flange containing the support bar on the second end of the roller cover. The bolt holes extend through that portion of the cover material which extends over the slot in the roller drum. Being located within the flange of the second end of the roller cover, the support bar also has aligned bolt holes for receipt of fastening bolts.

The roller cover is attached to the drum by placing the first end of the cover with its general L-shaped flange within the slot of the drum. The cover is then wrapped around the outer circumference of the roller and the flange of the second end of the roller cover with its tie down bar is placed in the slot over the first flange. Fastening bolts are inserted through the aligning holes in both the flanges located in the slot and threaded or attached to the drum itself. Cylindrical plugs are inserted within the bolt access holes in the cover material located over te slot to provide a continuous smooth cover surface. When it is necessary to replace the covering again, the plugs are removed and the fastening bolts disengaged to allow the release of the respective ends of the cover.

There is only one longitudinal or axial seam in the cover surface. In addtion, the support bar which is mounted within the larger flange of the second end of the cover provides adequate support for that portion of the cover material located over the slot to give a uniform resilience throughout the roller. Being inserted directly through the holes in the flanges of each end of the cover, the fastening bolts provide a secure anchor to the cover to avoid any possible slippage or misalignment between the respective ends of the cover.

The use of the plugs to fill the bolt access apertures in the cover band as well as having the support bar molded within one of the flanges eliminates the existence of a separate strip of cover material used to cover the fastening bolts and the support bar. Consequently, there is no relative slippage between a separate strip and the remainder of the cover which would otherwise cause problems for the overall cutting operation.

Having the support bar molded within one of the flanges on each cover band and by using the fastening bolts with the cover plugs, it is not necessary to remove all the cover bands when only one needs to be removed.

The present cover band latching arrangement allows greater efficiency in the removal and replacement of the cover bands, requiring considerably less time than is necessary with some prior arrangements.

BRIEF DESCRIPTION OF THE DRAWINGS

FIG. 1 is a perspective view of the machinery utilizing the roller cover attachment means;

FIG. 2 is a top view of the roller having a series of the cover bands oriented with their axial seams in line;

FIG. 3 is an alternate arrangement of the series of cover bands with their seam lines of FIG. 2 offset from each other;

DETAILED DESCRIPTION OF THE INVENTION

Figure 4:
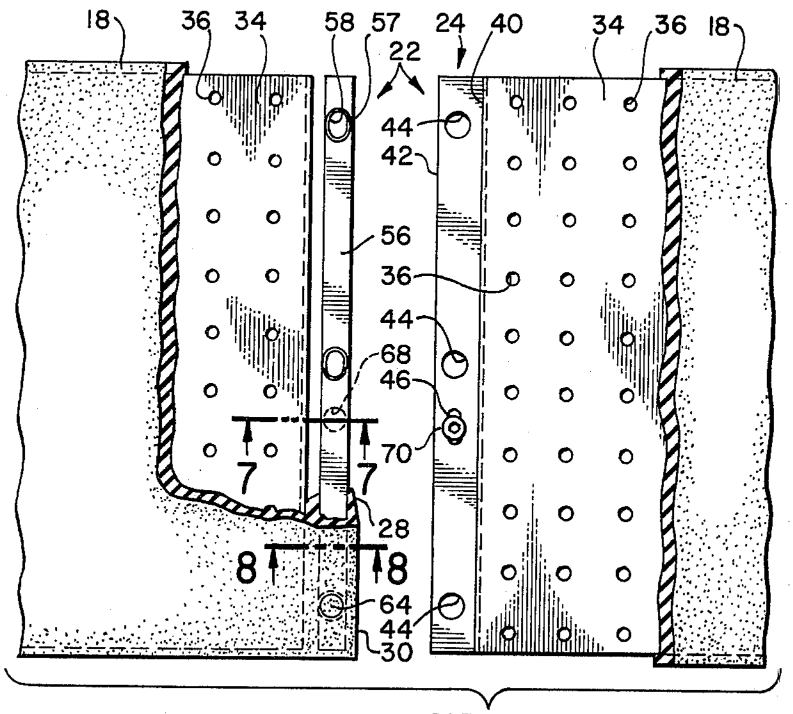
FIG. 4 is an exterior view of the respective ends of the cover band showing the attachment means with the cover material partially broken away.

FIG. 1 shows a typical rotary die cutter 8 with a cutting roller 10 having a series of cutters 12 located on its periphery designed to cut into corrugated material 14 which is proceeding in the direction of the arrow A. Located adjacent the cutting roller 10 is an anvil roller or drum 16 with a pliable roller cover 17 attached to its exterior surface. Typically, as shown in FIGS. 2 and 3 the roller cover 17 is comprised of a plurality of cover bands 18 each of which is a separate circumferential band to be wrapped around the roller 16 to cover a longitudinal portion of the exterior surface of the roller. The use of the plurality of bands 18 allows for the ability to shift the bands to accommmodate a more even wear of the bands. Further, if one band becomes too worn or damaged, it may be replaced without removal of the remaining bands.

Figure 5:
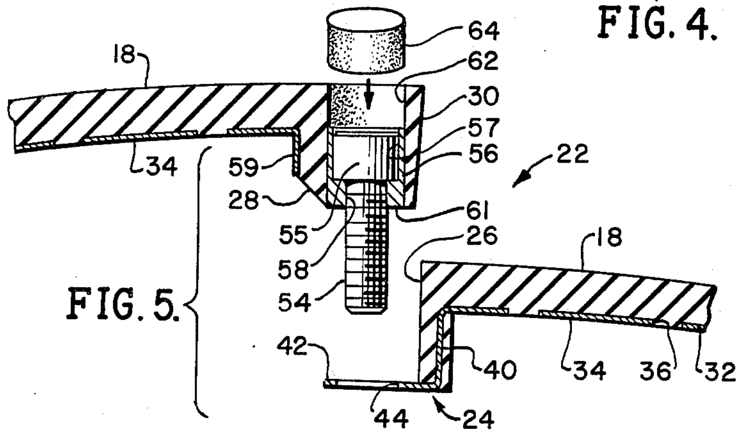
FIG. 5 is a partial sectional view showing the respective ends of the cover band with its attachment means.

The arrangement for securing the cover band 18 to the roller 16 is shown geneally at 22 in FIGS. 4 and 5 and has a base flange 24 attached to the first ed 26 of the cover band 18 and a filler flange 28 attached to the second end 30 of the cover band 18. Located along the inner surface 32 of the cover band 18 is a metal backing plate 34 which provides additional strength to the somewhat resilient and pliable elastomer cover band 18. Located within the backing metal plate 34 are apertures 36 which aid in the molded adhesion of the resilient cover plate material to the metal backing plate 34. The metal backing plate 34 also acts as a restrainer to keep the pliable cover material 18 from growing or stretching during use which would otherwise cause it to become loose on the roller 16. The flange 24 is a cross-sectional L-shaped extension of the metal plate 34 with an inward extending portion 40 and an offset shoulder portion 42. Located within the offset shoulder portion 42 are a series of bolt apertures 44 and a single adjustment slot 46.

Figure 8:
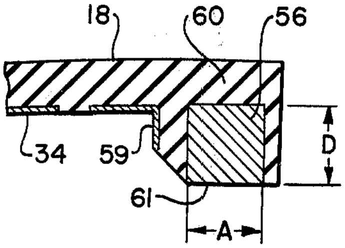
FIG. 8 is a sectional view taken along the line 8—8 in FIG. 4.
Figure 6:
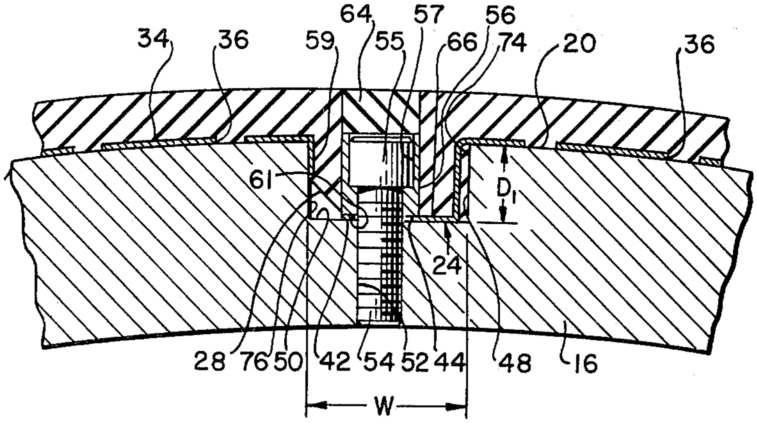
FIG. 6 is a sectional view taken along the line 6—6 in FIG. 2 showing the attachment means for the cover band connected to the drum.

With respect to FIG. 6 the flange 24 is positioned within a slot or keyway 48 which is oriented in a transverse or longitudinal directon in the surface 20 generally parallel with the axis of the roller 16. The offset shoulder portion 42 of the flange 24 is positoned on the bottom 50 of the slot 48. Threaded tap holes 52 are located in the bottom 50 of the slot 48 for receipt of the fastening bolts 54. The remaining space within the slot 48 above the shoulder portion 42 of the flange 24 is occupied by the filler flange 28 which is inserted within the cavity after the roller cover 18 has been placed around the roller on its exterior surface 20. Molded within the filler flange 28 is a metal tie or support bar 56 which is shown more clearly in FIGS. 4 and 8. Located within the support bar 56 are a series of bolt apertures 58 which are designed for alignment with the bolt apertures 44 of the flange 24 and bolt receiving holes 52 when the respective ends 26 and 30 of the cover band are placed in the slot 48. The bolt apertures 58 in the support bar 56 have enlarged shouldered portions 57 which receive the heads 55 of the bolts 54. Furthermore, the bolt apertures 58 have a general elongated oval shape as shown in FIG. 4 to allow for slight adjustment of the end 30 of the cover band for proper alignment with the location of the threaded tap holes 52.

The support bar 56 as shown in FIG. 6 is designed to be in engagement with the offset shoulder portion 42 of the base flange 24 when the respective flanges 28 and 24 are located within the slot 48. It should be noted that the metal backing plate 34 adjacent the filler flange 28 has an inward shoulder 59 which provides some strength to the filler flange 28 for its engagement with the slot 48. With respect to FIG. 8 it should be noted that the depth D of the support bar 56 is designed to insure that the portion 60 of the cover band which extends over the slot 48 has the approximate same thickness as the remaining portion of the cover band that extends around the exterior surface 20 of the drum 16. This is accomplished by having the support bar depth D be substantially the same as the depth $D_1$ of the slot 48 in FIG. 6. Consequently, the bottom 61 of the support bar 56 is in close engagement with the thin offset shoulder 42 of the metal backing plate and the bottom 50 of the slot. The support bar hs a general rectangular cross-sectional shape in FIG. 8 with a thickness A which occupies a substantial portion of the width W of the slot 48 in FIG. 6. The relative size of the support bar provides substantially the same support to that portion 60 of the cover in FIG. 8 which is over the slot as the support given to the remainder of the cover by the exterior surface 20 of the roller itself. This uniform support is quite critical to the cutting operation, for it is very undesirable to have a portion of the cover be softer or more resilient in certain areas than in other areas. An imperfect cut could result from such an uneven characteristic. In essence, the support bar acts as a filler to occupy the slot and give the roller a continuous hard exterior surface 20 as if there were no slot. Preferably the support bar is made from aluminum.

In addition to providing the requisite firm support within the slot 48 to give the desired resiliency in the cover portion 60 over the slot, the support bar 56 provides a firm facing surface for the fastening bolts 54 when they ae tightened down into the roller 16. Therefore, the cutting blades 12 in FIG. 1 on the cutting drum 10 will experience the same resilient resistance of the cover band 18 throughout the circumference of the roller 16.

As shown in FIG. 5, located over each of the bolt apertures 58 is a cover band plug aperture 62 which is designed to receive a plug 64 of the same material as that of the cover band 18. The plug aperture 62 with the plug 64 removed allows access to the fastening bolts 54 when attaching or removing the cover band to or from the roller 16. Once the bolts 54 are in place, the plugs 64 is inserted within the plug apertures 62 to provide a smooth contnuous surface of the cover band 18.

Figure 7:
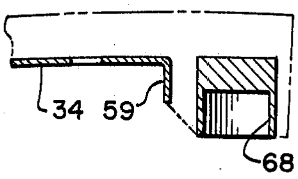
FIG. 7 is a sectional view taken along the line 7—7 in FIG. 4.

It should be noted that the fastening bolts 54 are inserted directly through both the filler flange 28 with the support bar 48 in the one end 30 of the roller band and the base flange 24 located on the other end of the cover band 18. This provides a positive attachment between the fastening bolts 54 and the respective ends 30 and 26 of the cover band, eliminating possible slippage of the roller band between its respective ends 26 to 30. With respect to FIGS. 4 and 7 a recess aperture 68 is located within the support bar 56 for receipt of the head of a positioning bolt 70 which is used for loosely holding of the base flange 24 within the slot 48 in FIG. 6 prior to the insertion of the filler flange 28 and the secure atachment of the fastening bolts 54. Although in FIG. 4 the latching assembly 22 is shown for use with three fastening bolts, in some cases the latching assembly could be designed for use with only two fastening bolts.

Turning to the operation and use of the cover band 18, atttention is directed to FIGS. 4 to 6, showing the installation of the cover band 18 by first placing the flange 24 of the first end 26 of the bnd 18 within the slot 48. The offset shoulder 42 of the flange 24 is located on the bottom 50 of the slot 48 and the positioning bolt 70 is inserted through an adjustment slot 46 and attached to the roller drum 16 to temporarily and loosely hold the flange 24 positioned within the slot 48. The roller 16 is then rotated to receive the cover band 18 around the cirucumference of the exterior surface of the roller 16 until the other end 30 of the cover band is reached. At that point, the filler flange 28 on the other end 30 of the cover band is inserted within the slot 48 and positioned over the offset shoulder portion 42 of the base flange 24. The respective bolt apertures 58 located in the tie bar 56 in the filler flange 28 ae aligned with the bolt apertures 44 located in the offset shoulder of the flange 24. Since the positioning bolt 70 loosely attaches the flange 24 within the keyway 48 and is inserted through the adjustment slot 46 the respective ends 30 and 26 of the cover band can be transversely adjusted for proper axial alignment. Once the respective bolt apertures 58 and 44 are aligned, the fastening bolts 54 are inserted and fastened into the bolt receiving holes 52. It should be noted that the recess 68 in the tie bar 56 receives the head of the positioning bolt 70. After each of the fastening bolts 54 are tightly secured, the plug apertures 62 located directly above the bolts are filled by the insertion of the plugs 64 to provide a smooth continuous surface of the cover band 18.

In normal practice a series of cover bands 18 are utilized on a roller 15 as shown in FIG. 2. Therefore, depending upon the positioning of the cutting blades 12 in FIG. 1 on the cutting roller 10 certain portions or areas on the roller 16 may receive more wear than others. In order to compensate for uneven wearing it is possible to replace only certain sections or portions 18 of the cover material on the roller 16 rather than replacing the entire cover 17 on the roller. This replacement can be accomplished without removing the other bands. Therefore the individual cover bands 18 can be replaced depending upon wear. Further, it may be possible to periodically adjust the relative locations of the cover bands in order to get more even wear throughout all of the respective cover bands.

It should be noted that, when the respective ends 26 and 30 of all of the cover bands are oriented the same within the slot 48, only one in-line continuous seam 66 will exist as in FIG. 2. However, in some instances it may be desirable to not have a single in-line continuous seam 66, but rather have the seam somewhat offset to alleviate the potential of having a wide cutting blade sink into the seam 66. Therefore, with the present invention it is possible to slightly offset the seam 66 on the respective adjacent cover bands by reversing the orientation of the respective ends 26 and 30 of each cover band, giving the offset of the seams 66 shown in FIG. 3. This is accomplished for instance by orienting the ends of the first cover band 18 which is adjacent one of the circumferential ends 72 of the roller 16 in a similar orientation as shown in FIG. 6. However, with the next adjacent roller band **18*a* in FIG. 3 the respective ends 26 and 30 of the cover band 18*a* are reversed with respect to cover band 18. Therefore, with respect to FIGS. 3 and 6 the first end 26 of the cover band 18 will be adjacent one side 74 of the slot 48 while the second end 30 of cover band 18 will be adjacent the other side 76 of the slot. On the other hand, in cover band 18*a* the first end 26 will be adjacent the other side 76 of the slot while the second end 30 of the cover band 18*a* will be adjacent the one side 74 of the slot 48. The orientation is repeated with cover band 18*b* oriented like cover band 18 while cover band 18*c* is oriented like cover band 18*a*.**

What is claimed is:

1. A replaceable cover assembly for an anvil roller to provide a contact surface for cutting blades located on an adjacent rotary cutting roller, said anvil roller having a transverse slot generally parallel to the axis of said roller, said cover comprising:

a cover band of an elastomeric material for positioning around said roller and having a first end and a second end;

a backing plate of material more rigid than said elastomeric material securely attached to the interior surface of said cover band;

an inwardly extending backing plate flange integrally connected to said backing plate adjacent said first end of said cover band for insertion in said alot adjacent one edge of the slot, said flange having an offset portion extending beyond said first end for contact with a substantial portion of the bottom of said slot;

a depending inward cover band flange of elastomeric material connected to said second end of said cover band, said depending flange being positioned in said slot above and in contact with said backing plate flange;

a flange of elastomeric material integrally connected to said cover band first end for extending into said slot between said backing plate flange and said cover band flange on said second end;

a flange integrally connected to said backing plate adjacent said cover band second end for extending into said slot adjacent the other edge of the slot, said flanges filling said slot so that the exterior surface of the cover band above said slot is uniform and uninterrupted except for a seam between said cover band ends; and means for fastening said backing plate flange and said cover band flange to said roller in said slot.

2. A replaceable cover assembly as defined in claim 1 and additionally comprising a support bar securely mounted within said cover band flange connected to said second end.

3. A replaceable cover assembly as defined in claim 2 wherein said support bar contacts said offset portion of said backing plate flange and has a depth substantially equal to the depth of said slot so that said cover material located over said slot will have substantially the same resiliency for said cutting blades as said cover material around the remainder of said anvil roller.

4. A replaceable cover for an anvil roller to provide a contact surface for cutting blades located on an adjacent rotary cuttng roller, said anvil roller having a transverse slot generally parallel to the axis of said roller, said cover comprising:

a cover band of an elastomeric material having a first end and a second end positioned in said slot;

a backing plate of material more rigid than said elastomeric material securely attached to the interior surface of said cover band;

an inward extending backing plate flange integrally connected to said backing plate adjacent said first end of said cover band for insertion in said slot, said flange having an offset portion extending beyond said first end for contact with a substantial portion of the bottom of said slot;

a depending inward cover band flange integrally connected to said second end of said cover band, said depending flange positioned in said slot above and in contact with said backing plate flange;

a support bar securely mounted within said cover band flange; and means for fastening said backing plate flange and said cover band flange to said roller in said slot; said fastening means including:

a plurality of bolt apertures in said offset portion of said backing plate flange;

a plurality of bolt apertures in said cover band flange;

a plurality of tap holes in said bottom of said slot; and a plurality of fastening bolts extending through said plurality of backing plate flange apertures and said plurality of cover band flange apertures and into said tap holes.

5. A replaceable cover as defined in claim 4 wherein said cover band flange apertures extend through said support bar.

6. A replaceable cover for a cylindrical machinery drum having a transverse slot, said cover comprising:

a cover band with a first end and a second end for positioning within said slot;

a fastener for adjustably attaching said first end of said cover band in said slot;

a transversly extending adjustment slot formed in a flange connected to said first end of said cover band, said fastener extending through said adjusting slot and into said drum for allowing transverse adjustment of said first end to align with said second end of said cover band when the latter is placed adjacent said first end; and means for firmly fastening said first and second ends of said cover band to said drum in adjusted juxtaposed relation with each other.

7. The assembly of claim 1 wherein said fastening means includes means in said slot for temporarily attaching said backing plate to said roller in a manner to permit transverse adjustment of such attached end of said cover band end to align it with the other end of the band.

8. A method of attaching replaceable cover bands on a cylindrical machinery drum, said cover bands having a first end and a second end on which are located respective first and second flanges wherein the second flange has a support bar molded therein, said second flange being larger than said first flange so that the transverse seam of the junction of said first and second flanges in said slot is offset from the longitudinal center of said slot, said method comprising the steps of:

positoning said first flange of said first end of one of said cover bands adjacent one side of said slot;

wrapping said cover band around the outside surface of said drum;

positioning said second flangwe of said cover band with said support bar adjacent the pother side of said slot;

inserting fastening means through said first and second flanges to securely anchor said cover to said drum to form a continuous cover for said drum with no more than one transverse seam in said cover band;

positioning the second flange of the second end of a second cover band adjacent said one side of said slot next to said first end of said one of said cover bands;

wrapping said second cover band around said outside surface of said drum;

positioning the first flange of the first end of said second cover band with a support bar adjacent said other side of said slot; and fastening said first and second flanges of said second cover band securely within said slot to form a continuous cover having no more than a single seam, said one transverse seam of said one cover band being offset from said single seam off said second cover band.

9. The method of claim 8 including the additional step, prior to securely fastening the ends of said cover bands to said drum, of: loosely attaching one end of each of said cover bands in said slot in a manner to permit transverse adjustment of such end so that when the other end of the cover band is positioned in the slot, the loosely attached end may be transversely adjusted to be properly aligned with the other end

10. A replaceable cover arrangement for a roller, said arrangement comprising:

a transverse slot located in thesurface of said roller and having two transverse edges;

a first cover band positioned around said roller in a first direction;

a second cover band positioned around said roller in a direction opposite to said first direction adjacent said first cover band, said first and second cover bands each having two ends joined together in said slot forming transverse seams in each of said cover bands;

a base flange connected to one of said two ends of each of said first and second cover bands;

a filler flange connected to the other of said two ends of each of said first and second cover bands, said filler flange being larger than said base flange and occupying a greater portion of said slot than said base flange resulting in the transverse seams at the junctions of said ends of each of said cover bands being offset from the longitidinal center of said slot, said transverse seam of one of said cover bands being close to one of said two transverse edges of said slot and said transverse seam of the other of said cover bands being closer to the other of said transverse edges of said slot resulting in said transverse seams being offset from each other; and means extending through said first and second flanges for securing said first and second ends of said cover band to said drum.

11. A latching assembly for securing a relaceable cover to a machinery roller, said assembly comprising:

a roller;

a circumferential backing plate extending around the exterior surface of said roller, said plate having a first end and a second end;

a transverse slot in said exterior surface of said roller for receipt of said first and second ends of said plate;

a base L-shaped flange extending from said first end of said plate for placement in said slot, said base flange having an offset portion for contact with a substantial portion of the bottom of said slot;

an inwardly shouldered flange extending from said second end of said plate for placement adjacent the one side of said slot;

a pliable cover of general uniform thickness circumferentially attached to said plate;

a filler flange intergrally attached to one end of said cover adjacent said first end of said plate;

a support bar securely mounted within said filler flange, said filler flange located in said slot in contact with and over said offset portion of said base flange;

a plurality of bolt apertures located in said offset portion of said base flange;

a plurality of botl apertures located in said filler flange and through said support bar;

a plurality of anchoring tap holes in said bottom of said slot; and a plurality of fastening bolts extending through said plurality of base flange apertures and filler flange apertures and into said tap holes.

* * * * *